US012714034B2

(12) United States Patent
Littlejohn-Mifsud et al.

(10) Patent No.: US 12,714,034 B2
(45) Date of Patent: Aug. 25, 2026

(54) METHOD FOR SUPPORTING A PLANT

(71) Applicants: Brett Littlejohn-Mifsud, Oxley (AU); Jessica Leigh Noonan, Oxley (AU)

(72) Inventors: Brett Littlejohn-Mifsud, Oxley (AU); Jessica Leigh Noonan, Oxley (AU)

( * ) Notice: Subject to any disclaimer, the term of this patent is extended or adjusted under 35 U.S.C. 154(b) by 0 days.

(21) Appl. No.: 19/250,652

(22) Filed: Jun. 26, 2025

(65) Prior Publication Data

US 2025/0318478 A1 Oct. 16, 2025

Related U.S. Application Data

(63) Continuation-in-part of application No. 18/110,753, filed on Feb. 16, 2023, now abandoned.

(51) Int. Cl.
*A01G 9/12* (2006.01)

(52) U.S. Cl.
CPC ............ *A01G 9/124* (2013.01); *A01G 9/128* (2013.01)

(58) Field of Classification Search
CPC ...... A01G 9/128; A63H 33/08; A63H 33/086; A63H 33/088
USPC ........................................................ 446/126
See application file for complete search history.

(56) References Cited

U.S. PATENT DOCUMENTS 1,958,508 A * 5/1934 Audet ................. A63H 33/088 446/184
2,083,678 A * 6/1937 Wilson .................... A01G 9/12 403/186
2,493,435 A * 1/1950 Arehambault ....... A63H 33/088 446/124
3,481,068 A * 12/1969 Paulson ............... A63H 33/088 446/128
3,487,579 A * 1/1970 Brettingen ........... A63H 33/086 446/128
3,877,170 A * 4/1975 Bakker ................ A63H 33/088 446/124
4,025,015 A * 5/1977 Kolic ........................ F16L 3/13 248/229.11

(Continued)

FOREIGN PATENT DOCUMENTS

AU 2014233847 A1 * 10/2015 ............ A01G 9/025
CN 113605314 A * 11/2021 ............ A01G 20/00

(Continued)

*Primary Examiner* — Morgan T Jordan
(74) *Attorney, Agent, or Firm* — Eric Karich; Karich & Associates

(57) ABSTRACT

A method for supporting a plant has the steps of providing a trellis having a plurality of annular frames and a base structure. Each of the plurality of annular frames includes a front surface having a plurality of posts, and a rear surface having a plurality of receiving recesses. A plant and a plant support fastener are provided that includes a fastener body that extends to ends which each include either a post or a receiving recess. Adjacent annular frames are connected together via frictional engagement of at least some of the plurality of posts of a first annular frame with at least some of the receiving recesses of a second annular frame, such that the front surface of the first annular frame abuts the rear surface of the second annular frame. The plurality of annular frames are mounted on the base structure. Finally, the plant may be fastened to at least one of the plurality of annular frames using the plant support fastener.

13 Claims, 7 Drawing Sheets

(56) References Cited

U.S. PATENT DOCUMENTS 4,183,167 A * 1/1980 Jatich ........................ A63F 9/06 446/118
4,211,033 A * 7/1980 Ringer ..................... A01G 9/12 220/4.16
4,355,485 A * 10/1982 Frank ..................... A01G 9/023 47/82
4,576,664 A * 3/1986 Delahunty ................ F16L 3/08 24/304
4,602,908 A * 7/1986 Kroeber ............... A63H 33/088 446/124
4,964,834 A * 10/1990 Myller ................. A63H 33/086 446/128
5,057,049 A * 10/1991 Kaczperski .......... A63H 33/086 446/124
D343,426 S * 1/1994 Sher .............................. 446/128
5,323,559 A * 6/1994 Allman .................. A01G 17/06 52/646
5,545,070 A * 8/1996 Liu ........................ A63H 33/10 446/104
5,640,802 A * 6/1997 Elliott ...................... A01G 9/12 248/156
5,810,639 A 9/1998 Liu
5,913,477 A * 6/1999 Dean ...................... A01G 25/02 239/289
6,401,385 B1 * 6/2002 Kleinert ................. A01G 9/128 47/29.1
6,634,920 B1 * 10/2003 Michaelsen ............ A63H 33/04 446/128
6,679,780 B1 * 1/2004 Shih ...................... A63F 9/1204 273/156
7,017,299 B1 * 3/2006 Speed ...................... A01G 9/12 47/21.1
7,416,166 B1 * 8/2008 Shaw ........................ B60P 3/36 446/128
2005/0191932 A1 * 9/2005 Lin ...................... A63H 33/086 446/85
2007/0006544 A1 * 1/2007 Washburn ............ A01G 13/105 52/579
2009/0017716 A1 * 1/2009 Marzetta .............. A63H 33/108 446/128
2011/0197502 A1 * 8/2011 Morris ..................... A01G 9/12 47/39
2011/0197505 A1 8/2011 Hansen
2012/0012516 A1 * 1/2012 Torres Junco ........... A01G 9/12 210/242.1
2012/0055083 A1 * 3/2012 Marquez .................. A01G 9/12 47/45
2013/0091767 A1 * 4/2013 Riesco Prieto ......... C02F 3/327 47/59 R
2016/0324081 A1 * 11/2016 Johnson ................... A01G 9/12
2016/0346707 A1 * 12/2016 Kuo .......................... E04B 2/12
2017/0087480 A1 * 3/2017 Poulus ................. A63H 33/086
2017/0258017 A1 * 9/2017 Scaletta ................. A01G 17/06
2020/0113140 A1 * 4/2020 Scott ...................... A01G 17/06
2022/0064941 A1 * 3/2022 Bowers ..................... E04B 2/18
2022/0078979 A1 3/2022 Brady
2022/0400635 A1 * 12/2022 Howe .................... A01G 31/06

FOREIGN PATENT DOCUMENTS

DE 3925401 A1 * 2/1991 ............. E04C 1/395
EP 0027840 A1 * 5/1981 ........... A63H 33/086
FR 2979251 A1 * 3/2013 ........... A63H 33/088
GB 2255488 A * 11/1992 ............. A01G 9/128
IL 277674 4/2022
KR 200466079 4/2013

* cited by examiner

METHOD FOR SUPPORTING A PLANT

CROSS-REFERENCE TO RELATED APPLICATIONS

This application for a utility patent is a continuation-in-part of a previously filed utility patent, still pending, having the application Ser. No. 18/110,753, filed 16 Feb. 2023.

BACKGROUND OF THE INVENTION

Field of the Invention

This invention relates generally to methods for supporting plants, and more particularly to a modular interlocking expandable plant trellis for supporting a plant.

Description of Related Art

A typical trellis is a frame often constructed of slats (e.g., wood, bamboo, metal) that supports plants, typically by securing a branch or vine of the plant to the slats via fasteners such as wires, ties, etc.

Modular annular trellis structures are also known; and an example is shown in Brady, U.S. 2022/007879. However, the annular components shown in Brady each abut one another along an outer edge, in a configuration that lacks structural integrity. Furthermore, the Brady trellis requires the use of separate U-shaped fasteners that clip adjacent annular structures together. These separate fasteners are easily lost, rendering the trellis useless.

The prior art does not teach modular annular structures that snap together such that front and rear surfaces overlap, in a cantilevered configuration, rather than abutting on the outer edges. The overlapping engagement provides improved structural integrity and ease of use not found in Brady. Unlike conventional trellises that rely on planar grid structures or edge-bound connections, the present invention enables face-to-face interlocking of annular frames, allowing vertical stacking and adaptive shaping that conforms dynamically to plant growth.

The prior art also does not teach the use of integral posts and receiving recesses on the front and rear faces of the annular structures, thereby enabling the annular components to be connected together without the use of a separate fastener. The present invention fulfills these needs and provides further advantages as described in the following summary.

SUMMARY OF THE INVENTION

The present invention teaches certain benefits in construction and use which give rise to the objectives described below.

The present invention provides a method for supporting a plant. The method comprises the steps of first providing a trellis comprising a plurality of annular frames and a base structure for supporting the plurality of annular frames, wherein each of the plurality of annular frames includes a front surface having a plurality of posts, the front surface being disposed on a front plane, and also having a rear surface having a plurality of receiving recesses, the rear surface being disposed on a rear plane, and wherein the front and rear planes are parallel and spaced apart from each other by a thickness of the annular frame. Next, providing a plant, and providing a plant support fastener that includes a fastener body that extends to ends which each include either a post or a receiving recess. Next, interlocking some of the plurality of posts of a first annular frame of the plurality of annular frames with some of the receiving recesses of a second annular frame, such that the front surface of the first annular frame abuts the rear surface of the second annular frame. Next, mounting the plurality of annular frames on the base structure, and then fastening the plant to one of the plurality of annular frames using the plant support fastener such that the ends of the fastener body are attached to at least one of the annular frames via the post or a receiving recess, and the plant support fastener is positioned around a portion of the plant.

A primary objective of the present invention is to provide a method for supporting a plant having advantages not taught by the prior art.

Another objective is to provide a method for supporting a plant that is modular annular structure.

Another objective is to provide a method for supporting a plant that includes annular frames that include posts and receiving recesses on the front and rear faces of the annular structures, thereby enabling front and rear faces to overlap, forming a cantilevered configuration rather than having an edge to edge abutting relationship.

Another objective is to provide a method for supporting a plant that does not require separate fasteners, but wherein the annular components can snap together based upon posts and receiving recesses that are integral with the annular structure.

A further objective is to provide a system wherein the annular components interlock via a continuous circular clutch geometry, offering 360° engagement rather than point-to-point contact as in most similar types of connectors.

A further objective is to provide a method for supporting a plant that includes plant support fasteners which may be snapped directly onto the annular structures for securing plants to the trellis without the use of wires and snaps.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

DETAILED DESCRIPTION OF THE INVENTION

The above-described drawing figures illustrate the invention, a method for supporting a plant using a plant trellis that is adapted to be mounted on or within a planter. The trellis is modular in construction, and various components of the trellis are interlocking so that the trellis is expandable and adjustable to meet the needs of a given user.

Figure 1:
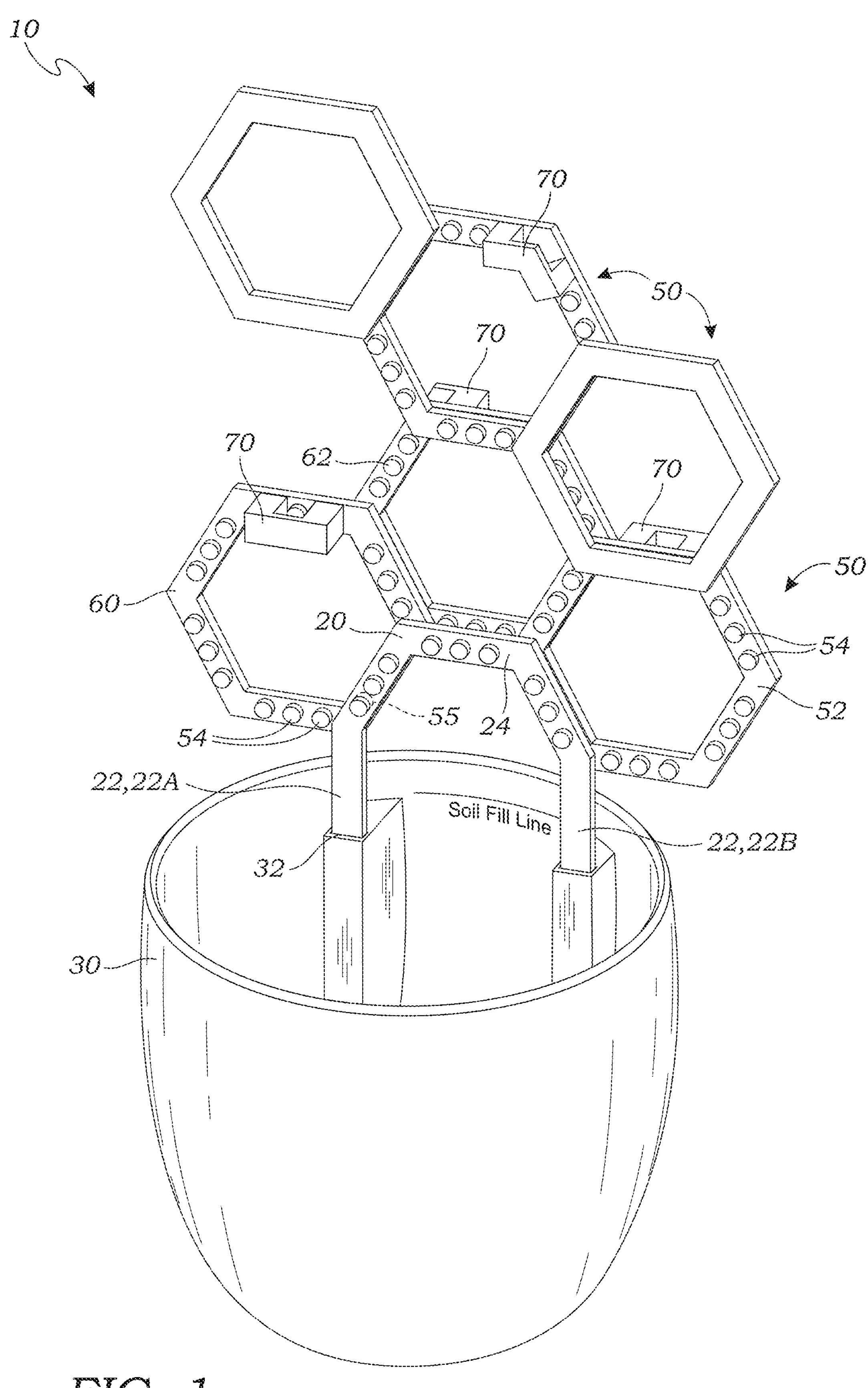
FIG. 1 is a perspective view of a trellis according to one embodiment of the present invention, including a base structure mounted in a planter, and a plurality of annular frames mounted on the base structure.
Figure 2:
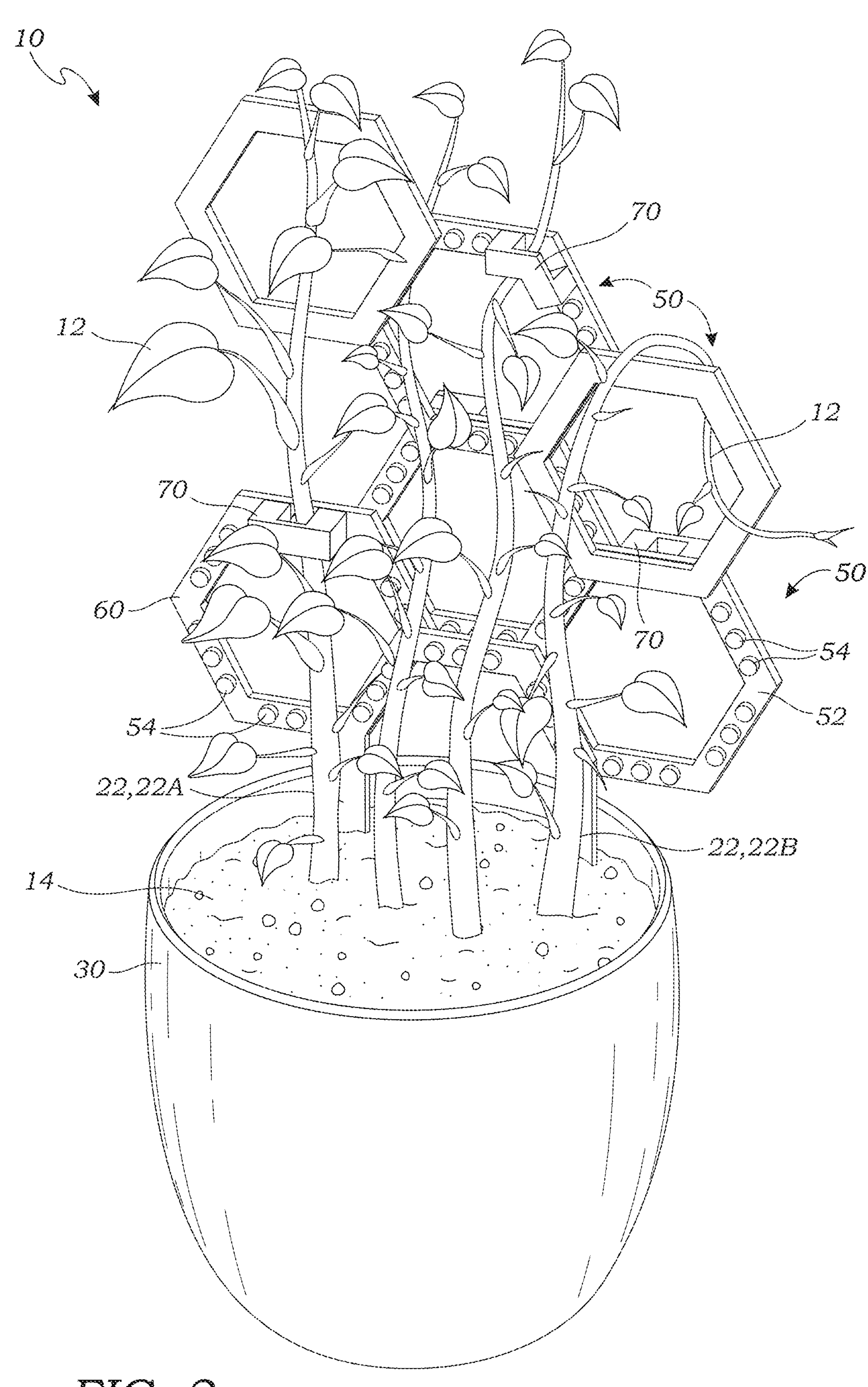
FIG. 2 is a perspective view thereof, further showing a plant and planting media within the planter.

FIG. 1 is a perspective view of a trellis 10 according to one embodiment of the present invention and shown installed in a planter 30, and FIG. 2 is a perspective view thereof, further showing the planter 30 containing planting media 14 and a plant 12. In various embodiments, the present invention is directed to a method for supporting the plant 12 with the trellis 10, the method and its structural elements being discussed in depth below.

As shown in FIGS. 1-2, the trellis 10 includes a base structure 20 mounted in a planter 30, and a plurality of annular frames 50 mounted on the base structure 20. The base structure 20 may include a means for interlocking the base structure 20 with the planter 30, when this form of planter 30 is used; however, it may also be used without the planter 30 illustrated. For example, in some implementations, the trellis 10 may be used in aquatic environments (not shown), including aquariums or hydroponic reservoirs, where the base structure may rest on or anchor within submerged surfaces. As shown in FIGS. 1-2, the base structure 20 of this embodiment has at least one elongate support post 22 (i.e., one means for interlocking) for supporting the base structure 20 in the planter 30. The support post 22 may be inserted into the planter 30, as illustrated, or it may be merely inserted into planting media 14 adjacent the plant 12 (e.g., in a regular prior art planter, or simply into the ground adjacent a plant in a garden). Unlike prior art system, where a base interlocks via studs on a horizontal plate, the present design uses downward extensions shaped to engage slotted receivers in a planter, or soil, supporting real plant loads.

While the system 10 may optionally be used in combination with the planter 30, it is fully operable as a standalone structure. It can be inserted directly into soil, hydroponic media, or alternative containers without compromising functionality. The integrated planter 30 is not essential to structural or functional operation.

For the purposes of this application, the terms “interlock,” “interlocking,” “interlocked,” are hereby defined to encompass any form of interlocking, snap-fit, friction-fit, or other equivalent forms of engagement.

Figures 3, 4:
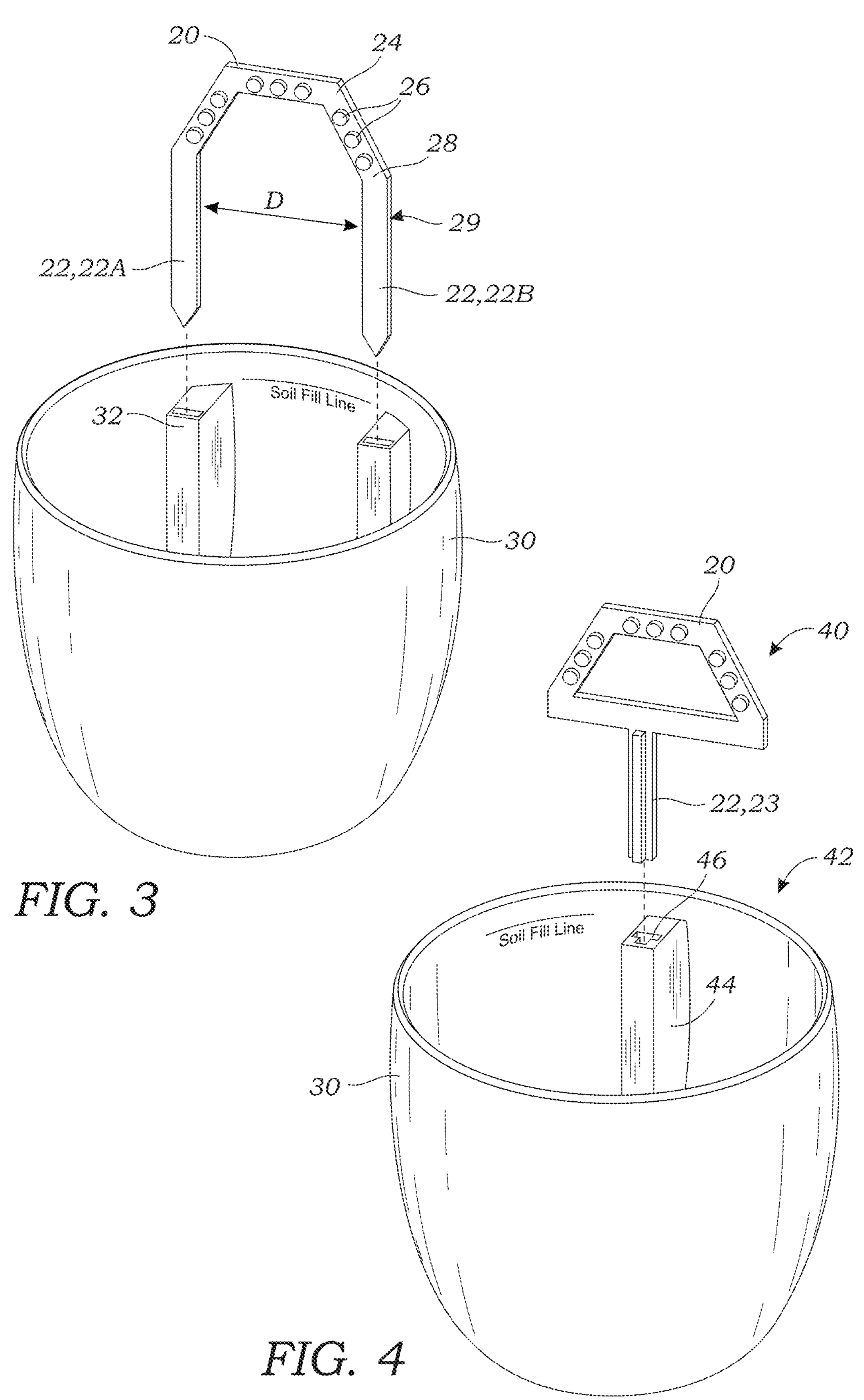
FIG. 3 is an exploded perspective view of the base structure of the trellis of FIG. 1, illustrating the base structure being inserted into the planter.
FIG. 4 is an exploded perspective view of a second embodiment of the base structure being inserted into a second embodiment of the planter.

FIG. 3 is an exploded perspective view of the base structure 20 of the trellis 10 of FIG. 1, illustrating the base structure 20 being inserted into the planter 30. In the embodiment of FIGS. 1-3, the at least one elongate support post 22 is in the form of a pair of spaced apart support posts 22A and 22B, spaced by a distance D. The support posts 22A and 22B may be inserted into a pair of slotted receivers 32 formed in the planter 30, which are laterally spaced the same distance D as the pair of support posts 22A and 22B, which enables the slotted receivers 32 to slidably receive the support posts 22A and 22B. While this form of interlocking is shown in the current embodiment, the support posts 22A and 22B may have alternative cross-sectional shapes (or other configurations) that interlock with other shapes of receivers, and such alternatives should be considered within the scope of the present invention.

In the embodiment of FIGS. 1-3, the elongate support post extends 22 upwardly to an interlocking structure 24 that includes a plurality of posts or receiving recesses 26. In this embodiment, as best shown in FIG. 2, the interlocking structure includes posts 26 on a front surface 28 of the structure 24; however, either posts or receiving recesses may be used, and they may be located on the front surface 28, a rear surface 29, or both.

The interlocking structure 24 is shown in the form of an arch made of three faces, which each contain three posts 26, the particular shape and construction of the structure 24 may vary, so long as the front or rear surfaces 28 and 29 include some form of posts, recesses, or other mating structures that enable the annular frames 50 to be mounted thereupon, as described in greater detail below.

FIG. 4 is an exploded perspective view of a second embodiment of the base structure 40 being inserted into a second embodiment of the planter 42. In this embodiment, the at least one elongate support post 22 is a single post 23 having a T-shaped cross-section. This single post 23 slides into a receiving post 44 of the planter 42, the receiving post 44 having a receiving slot 46 that also has a T-shaped cross-section. While this illustrates another embodiment of this invention, obviously other variations may be devised by those skilled in the art, and such alternatives should be considered within the scope of the present invention.

Figure 5:
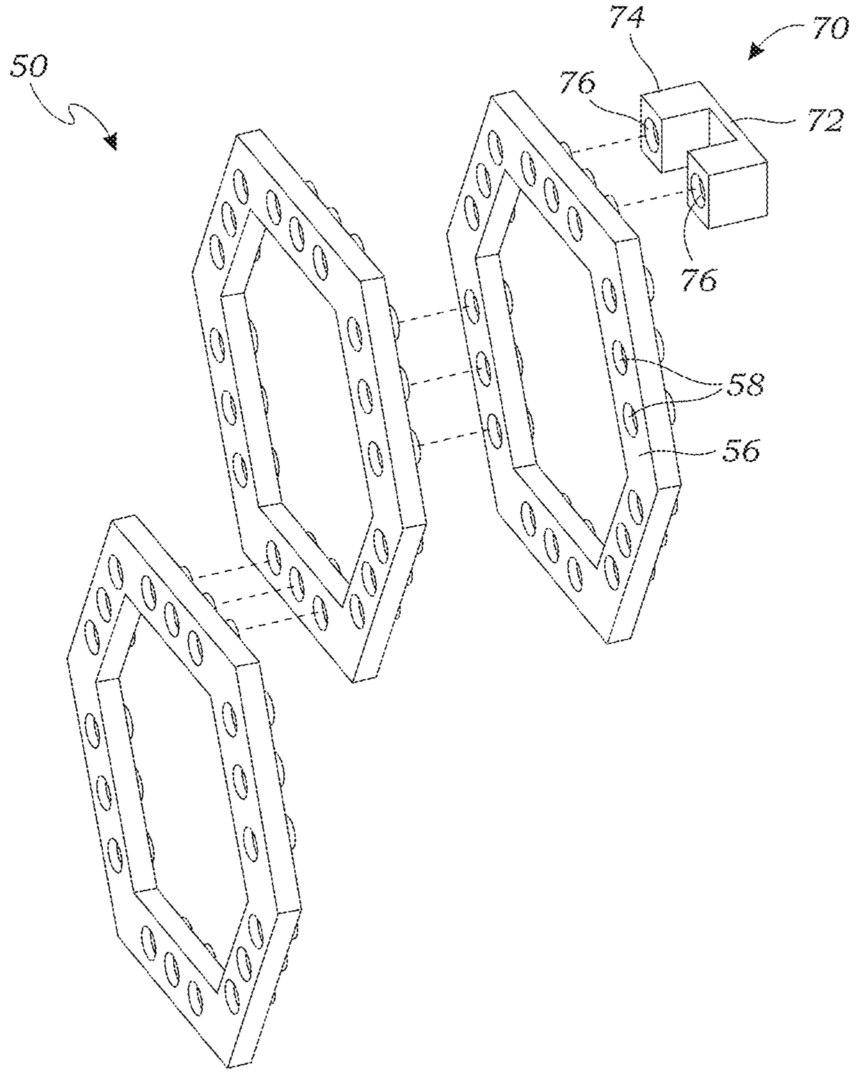
FIG. 5 is an exploded rear perspective view of three of the annular frames and a plant support fastener.
Figure 6:
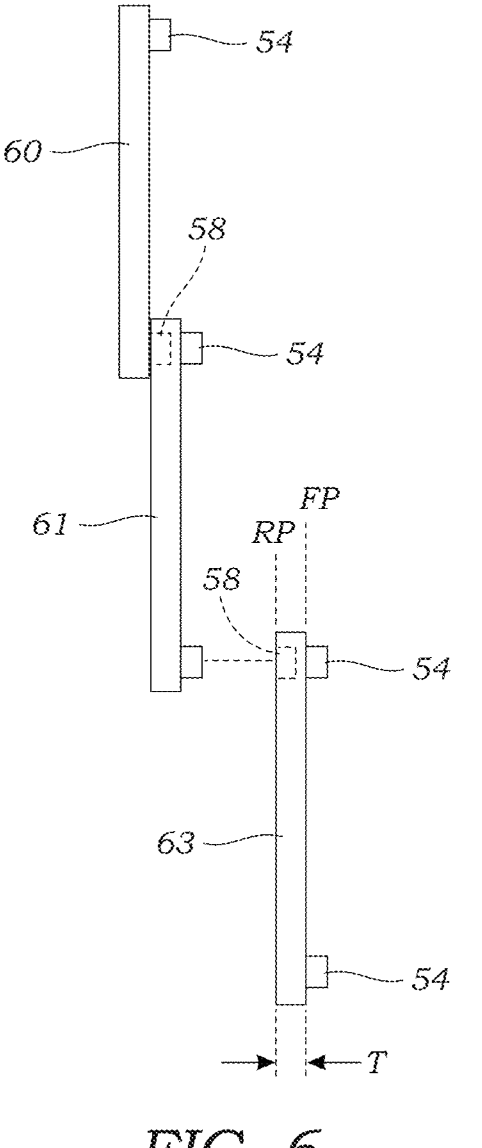
FIG. 6 is a partially exploded side elevation view of three of the annular frames in a first configuration.
Figure 7:
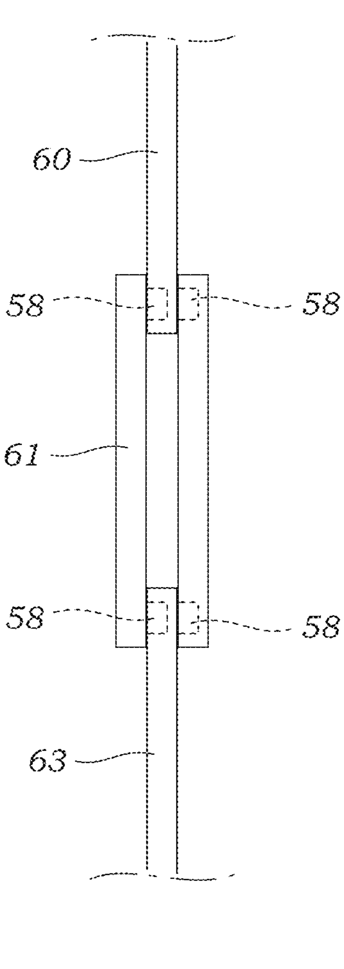
FIG. 7 is a side elevation view illustrating four annular frames arranged in a second configuration.

FIG. 5 is an exploded rear perspective view of three of the annular frames 50 of FIG. 1, further showing a plant support fastener 70. FIG. 6 is an exploded side elevation view of the three annular frames 50, illustrating a first configuration, and FIG. 7 is a side elevation view thereof, illustrating a second configuration. As shown in FIGS. 5-7, each of the plurality of annular frames 50 includes the front surface 52 with a plurality of posts 54 (best shown in FIG. 1), and a rear surface 56 with a plurality of receiving recesses 58 (best shown in FIG. 5). The front surface is disposed on a front plane, and the rear surface 56 is disposed on a rear plane, wherein the front and rear planes are parallel and spaced apart from each other by a thickness of the annular frame 50.

As shown, a first 60 of the annular frames 50 may be mounted on the interlocking structure 24 of the base structure 20 by interlocking at least some of the plurality of posts or receiving recesses (in this case posts 54) of the annular frame 60 with at least some of the plurality of posts or receiving recesses (in this case, receiving recesses 55) of the interlocking structure 22 of the base structure 20. Additional annular frames 62 may be mounted on the annular frames 50 in the same manner, by interlocking at least some of the plurality of posts or receiving recesses of the additional annular frames 62 with at least some of the plurality of posts or receiving recesses of the first of the annular frame 60.

As shown in FIG. 5, in this embodiment, the plurality of annular frames 50 are each hexagonal in shape, and each side of the hexagonal annular frame 50 has three spaced apart posts 54 on a front surface 52, and three receiving recesses 58 on a rear surface 56. In other embodiments, other shapes (e.g., triangular, rectangular, octagonal, etc.) may be used, and different numbers of or arrangements of posts and receiving recesses may be used, and such alternatives should be considered within the scope of the present invention.

One step of the method of use includes interlocking some of the plurality of posts of the first annular frame 60 with some of the receiving recesses of a second annular frame 61, such that the front surface of the first annular frame 60 abuts the rear surface of the second annular frame 61. Optionally, a next step includes interlocking the rear surface of a third annular frame 63 to the front surface of the second annular frame 61, such that the first 60, second 61, and third 63 annular frames are aligned at a third plane that is perpendicular to the first and second planes. The first 60, second 61, and third 63 annular frames are illustrated in FIGS. 5-7, and the additional annular frames 62 are illustrated in FIGS. 1-2.

In some implementations, the first and second planes are disposed along a Y axis, and the third plane is disposed along a Z axis, enabling face-to-face stacking and vertical modularity. This engagement may be achieved without the use of external fasteners, tools, or clips, enhancing ease of assembly and reducing component complexity. The annular frames 50 may be stacked in both forward and rearward directions relative to the primary support axis. This bidirectional stacking enables enhanced structural support, including counterbalancing lateral plant forces, and allows for trellis segments to share the same X-Y coordinates while differing along the Z-axis. As shown in FIGS. 6-7, this bidirectional face-to-face stacking enables modular construction along the Z-axis with structural alignment in the X-Y plane. The design supports tool-free assembly and allows the user to reinforce segments in either direction.

Figure 10:
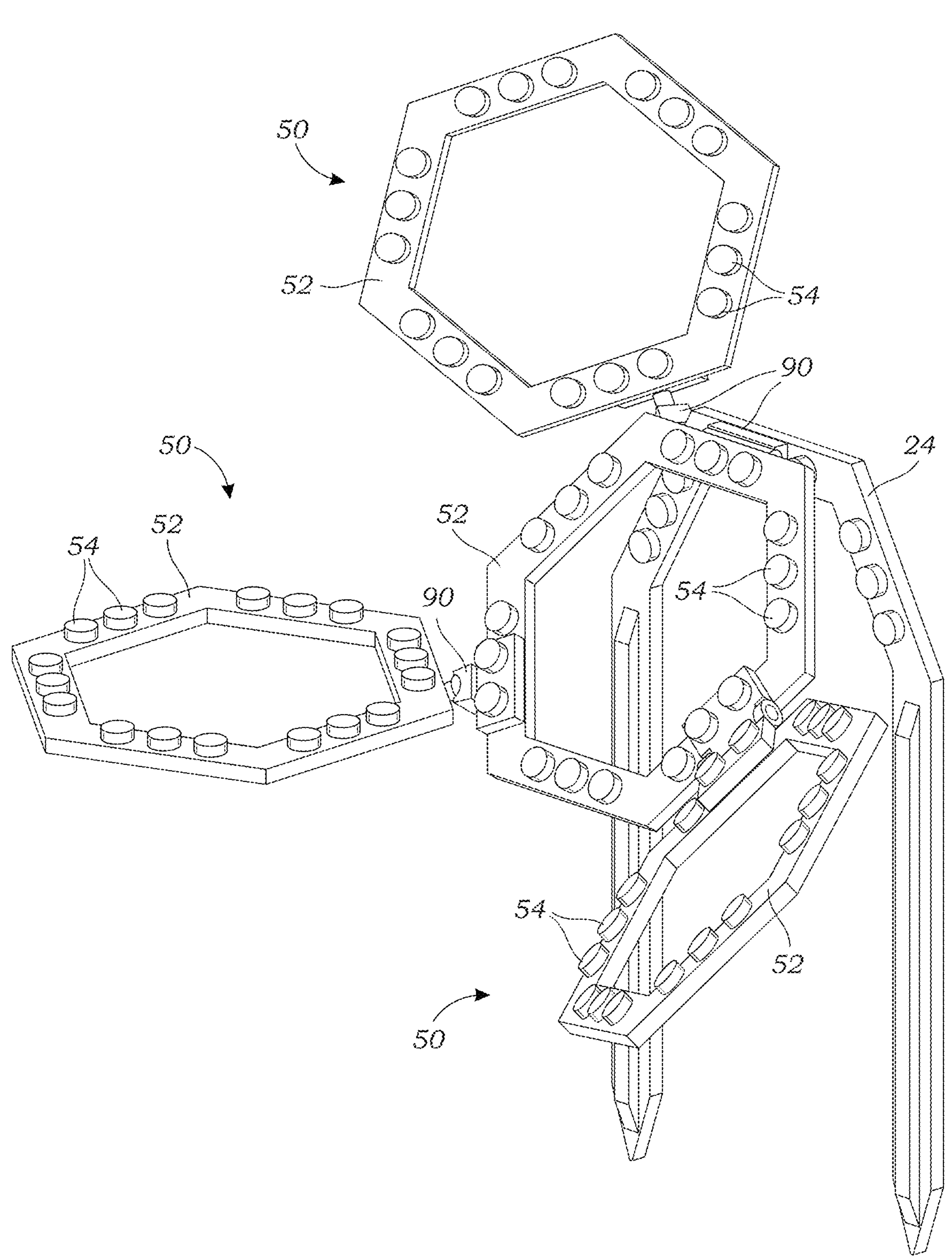
FIG. 10 is a perspective view of the plant support fastener in another configuration, illustrating hinge attachments which allow multi-axis positioning of the annular frames.

In this manner, the frames 50 are configured to stack in opposing forward and rearward directions about a shared mounting axis, enabling offset load distribution and counterbalancing of asymmetric plant growth. Offset positioning of the annular frames 50 enables counterweight distribution for uneven plant growth, allowing the user to construct trellises 10 that naturally counterbalance top-heavy or trailing plant species without additional, external hardware. As shown in FIG. 6, arranging annular frames 50 in asymmetric or non-uniform offsets relative to the vertical axis may provide structural counterbalance for uneven plant growth. Another example of such a structure is shown in FIG. 10 and discussed below.

Figure 9:
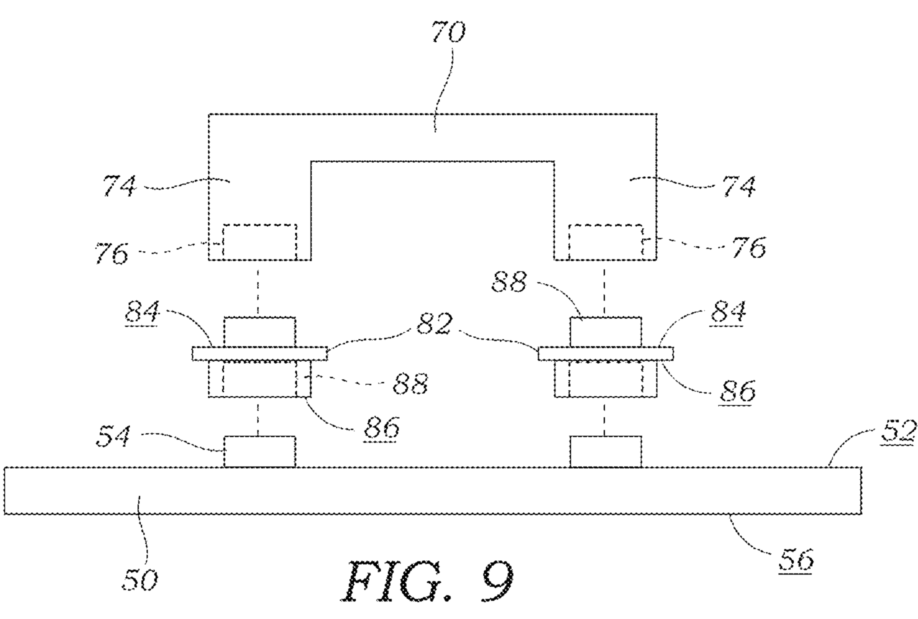
FIG. 9 is an exploded side elevation view of a plant support fastener and a pair of spacer blocks.

As shown in FIG. 5, the plant support fastener 70 may be provided for fastening the plant to the trellis 10. As illustrated, the plant support fastener 70 includes a fastener body 72 that extends to ends 74 which each include a post or a receiving recess (in this case, a receiving recess 76), so that the plant support fastener 70 may be removably connected to at least one of the annular frames 50 (as shown in FIGS. 1-2). The fastener body 72 forms an arch which is positioned over a branch, vine, etc., of the plant, for holding it in place, so that a wire or tie is not required. The fastening structure described herein enables the fasteners 70 to be easily snapped into place, moved, or removed, with great ease. Unlike prior art, the plant support fastener is not a general-purpose clip or tie. It is a purpose-built, integrated component that engages the same clutch and silhouette geometry as the annular frames. This enables users to attach, reposition, and remove the fastener without tools or additional parts, and ensures the fastener blends in with the frame—features not taught by any prior art. FIG. 9 is another drawing of the plant support fastener 70, discussed below.

As shown in FIG. 7, the trellis 10 may be constructed in a "double-stacked" or cantilevered configuration, which may provide localized reinforcement at stress points without tools or fasteners. Similar types of configurations may be constructed, as the present invention is adapted to be modifiable depending on the plant, weak points, and desired appearance, so other similar configurations should be considered within the scope of the present invention.

Figure 8:
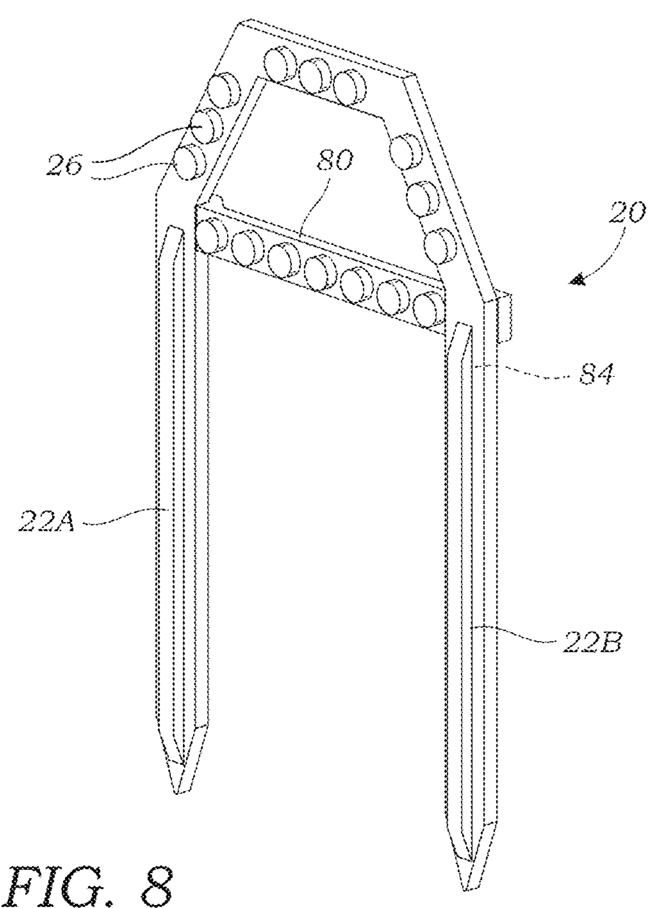
FIG. 8 is a perspective view of another embodiment of a base structure, showing a cross-support removably mounted thereto.

FIG. 8 is a perspective view of the base structure 20 showing a cross support 80 mounted thereto. As shown in FIG. 8, the at least one elongate support post 22 is in the form of a pair of spaced apart support posts 22A and 22B. The cross support 80 may include recesses or posts 84 to engage with the recesses or posts 26 of the base structure 20. In use, the cross support 80 may enhance the stability of the base structure 20, and potentially prevent it from sinking too far down into the planting media 14.

FIG. 9 is an exploded side elevation view of the plant support fastener 70 and a pair of spacer blocks 82. In some uses, the plant support fastener 70 may be provided in different sizes for different plants and annular frames. However, the plant support fastener 70 may also be adaptable to different thicknesses of plant portions, by extending the ends 74 of the plant support fastener 70 via the spacer blocks 82.

As illustrated in FIG. 9, a set of spacer blocks 82 each have a front surface 84 and a rear surface 86 which each include a post or a receiving recess 88. In use, the post or receiving recess 88 of the front surface 84 of each spacer block is interlocked with the post or receiving recess 76 of one of the ends 84 of the support fastener 70, and interlocking the post or receiving recess 88 of the rear surface 86 of each spacer block 82 with the posts or recesses 54/58 of one of the plurality of annular frames 50.

FIG. 10 is a perspective view of the plant support fastener 10 in another configuration, illustrating hinge attachments 90 which allow multi-axis positioning of the annular frames 50. The hinge/joint attachment 90 may have posts/recesses for attachment to one or more of the annular frames 50, enabling connected annular frames to be positioned at a range of different angles. Annular frames 50 may be joined using the hinge elements 90, enabling rotation between structural segments along X, Y, or Z axes. This allows the creation of curved, radial, or spherical trellis assemblies that mimic plant growth patterns.

In other embodiments, annular frames 50 may be provided with built-in hinges (not shown). The ability to change the angles of the trellis 10 may allow a user to more easily construct the trellis 10 around the shape and/or growth of the plant, or to create aesthetically pleasing structures. Furthermore, one or more rear-positioned stakes or interstitial blocks (not shown) may be used to reinforce the structure from behind, particularly in free-standing configurations.

In further still embodiments, the system may include connecting elements capable of spanning between non-adjacent modules, creating cantilevered segments that bridge gaps or form unsupported overhangs for aesthetic or functional reasons.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A method for supporting a plant, the method comprising the steps of:

providing a trellis comprising:

a plurality of annular frames; and a base structure for supporting the plurality of annular frames, wherein each of the plurality of annular frames includes a front surface having a plurality of posts, the front surface being disposed on a front plane, and wherein the annular frame also has a rear surface having a plurality of receiving recesses, the rear surface being disposed on a rear plane, and wherein the front and rear planes are parallel and spaced apart from each other by a thickness of the annular frame;

providing a plant;

providing a plant support fastener that includes a fastener body that extends to ends, wherein each of the ends includes either a post or a receiving recess;

interlocking some of the plurality of posts of a first annular frame of the plurality of annular frames with some of the receiving recesses of a second annular frame, such that the front surface of the first annular frame abuts the rear surface of the second annular frame;

mounting the plurality of annular frames on the base structure; and fastening the plant to one of the plurality of annular frames using the plant support fastener, such that the ends of the fastener body are attached to at least one of the annular frames via the post or the receiving recess, and the plant support fastener is positioned around a portion of the plant.

2. The method of claim 1, further comprising the steps of: providing the plant in a planter filled with planting media; and inserting at least one elongate support post of the base structure into the planting media of the planter adjacent the plant.

3. The method of claim 1, further comprising the step of interlocking the rear surface of a third annular frame to the front surface of the second annular frame, such that the first, second, and third annular frames are aligned at a third plane that is perpendicular to the first and second planes.

4. The method of claim 1, wherein the abutting annular frames are fastened together without the use of a separate fastener, but instead are fastened together by the posts and the receiving recesses which are integral to the annular frames.

5. The method of claim 1, wherein the annular frames are configured to stack in opposing forward and rearward directions about a shared mounting axis for offset load distribution and counterbalancing of asymmetric plant growth.

6. The method of claim 1, further comprising the step of arranging the annular frames in asymmetric or non-uniform offsets relative to a vertical axis to provide counterbalance.

7. The method of claim 1, further comprising the step of providing hinge-based connectors which permit rotational articulation of the annular frames along at least one axis.

8. The method of claim 1, further comprising the step of constructing a double-stacked configuration by interlocking the first of the annular frames with two of the annular frames, attached to the opposing front and rear sides of the first of the annular frames, such that the two annular frames are stacked and together sandwich the first of the annular frames between them, to provide localized reinforcement at stress points.

9. The method of claim 1, further comprising the step of connecting two or more of the annular frames using a hinge attachment having posts or receiving recesses on each of its opposing faces, the hinge attachment permitting rotational articulation of the connected annular frames.

10. The method of claim 1, further comprising the step of inserting the base structure into an aquatic environment, including at least one of an aquarium and a hydroponic reservoir, wherein the plurality of annular frames are mounted to support aquatic or hydroponically grown plants.

11. The method of claim 1, further comprising the step of providing a cross-support member to the base structure, the cross-support member having posts or receiving recesses, the cross-support member extending laterally between the support posts of the base structure to enhance lateral stability and to prevent the base structure from sinking excessively into planting media.

12. A method for supporting a plant, the method comprising the steps of:

providing a trellis comprising:

a plurality of annular frames; and a base structure for supporting the plurality of annular frames, wherein each of the plurality of annular frames includes a front surface having a plurality of posts, the front surface being disposed on a front plane, and wherein the annular frame also has a rear surface having a plurality of receiving recesses, the rear surface being disposed on a rear plane, and wherein the front and rear planes are parallel and spaced apart from each other by a thickness of the annular frame;

providing a plant;

providing a plant support fastener that includes a fastener body that extends to ends, wherein each of the ends includes either a post or a receiving recess;

interlocking some of the plurality of posts of a first annular frame of the plurality of annular frames with some of the receiving recesses of a second annular frame, such that the front surface of the first annular frame abuts the rear surface of the second annular frame;

mounting the plurality of annular frames on the base structure; and fastening the plant to one of the plurality of annular frames using the plant support fastener, such that the ends of the fastener body are attached to at least one of the annular frames via the post or the receiving recess, and the plant support fastener is positioned around a portion of the plant;

providing a set of spacer blocks each having a front surface and a rear surface, each of the front and the rear surfaces of the spacer block including a post or a receiving recess;

interlocking the post or receiving recess of the front surface of each spacer block with the post or receiving recess of one of the ends of the support fastener, and interlocking the post or receiving recess of the rear surface of each spacer block with the posts or recesses of one of the plurality of annular frames.

13. A method for supporting a plant in a planter, the method comprising the steps of:

providing a trellis comprising:

a plurality of annular frames; and a base structure for supporting the plurality of annular frames, wherein each of the plurality of annular frames includes a front surface having a plurality of posts, the front surface being disposed on a front plane, and wherein the annular frame also has a rear surface having a plurality of receiving recesses, the rear surface being disposed on a rear plane, and wherein the front and rear planes are parallel and spaced apart from each other by a thickness of the annular frame;

and a base structure for supporting the plurality of annular frames, the base structure having at least one elongate support post for supporting the base structure in the planter, the elongate support post extending upwardly to an interlocking structure that includes a plurality of posts or receiving recesses;

interlocking a first of the annular frames with the interlocking structure of the base structure by interlocking at least some of the plurality of posts or receiving recesses of the first annular frame with at least some of the plurality of posts or receiving recesses of the interlocking structure;

mounting additional annular frames by interlocking at least some of the plurality of posts or receiving recesses of the additional annular frames with at least some of the plurality of posts or receiving recesses of the first of the annular frames;

providing a plant support fastener that includes a fastener body that extends to ends, wherein each of the ends includes either a post or a receiving recess;

fastening the plant to one of the plurality of annular frames using the plant support fastener, such that the ends of the fastener body are attached to at least one of the plurality of annular frames via the post or the receiving recess, and the plant support fastener is positioned around a portion of the plant.

* * * * *